June 25, 1946.　　　B. W. KEESE　　　2,402,637
DRIVE MECHANISM
Filed June 30, 1944　　　3 Sheets-Sheet 1

Inventor
Beverly W. Keese
Strauch & Hoffman
Attorneys

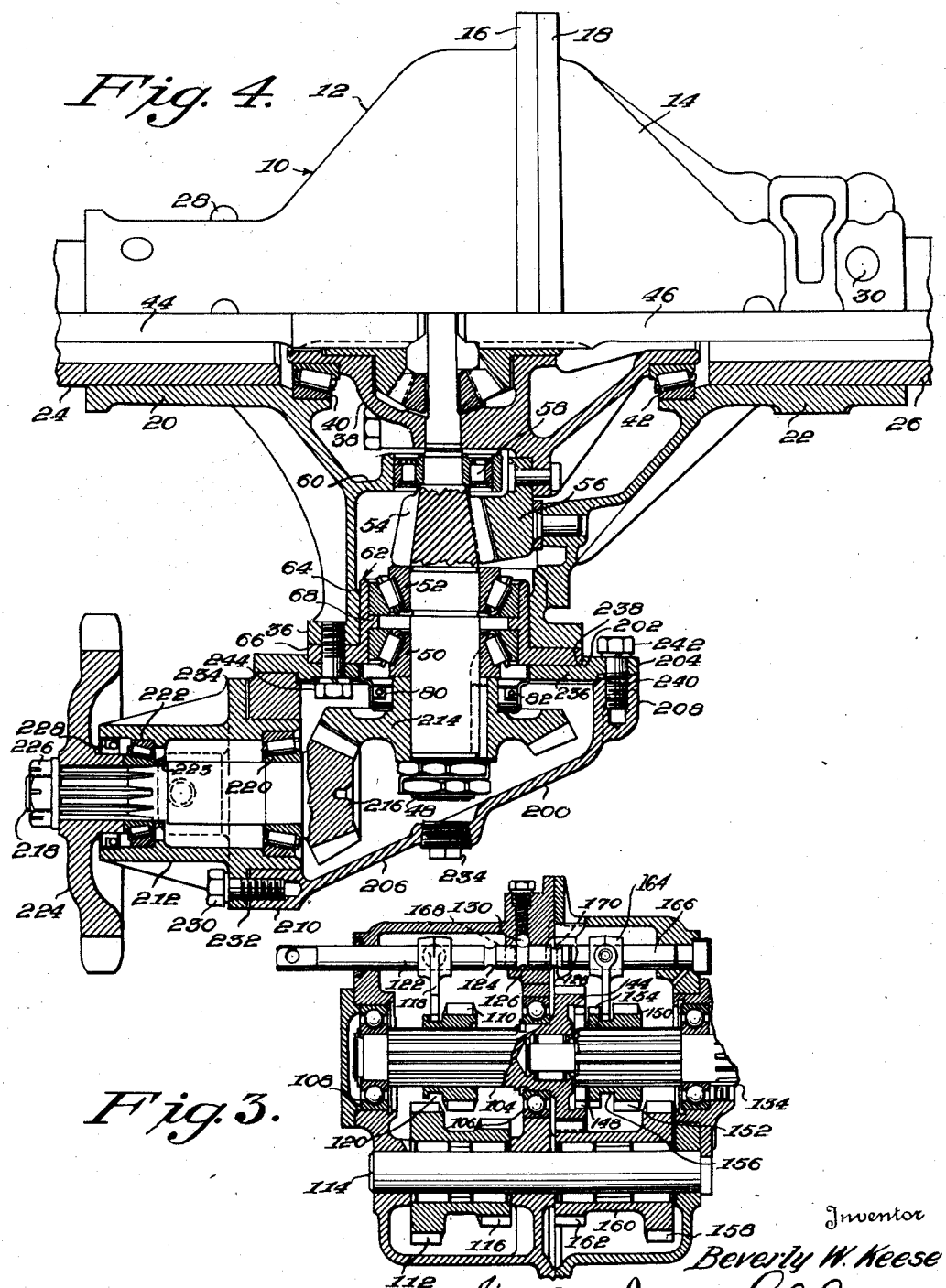

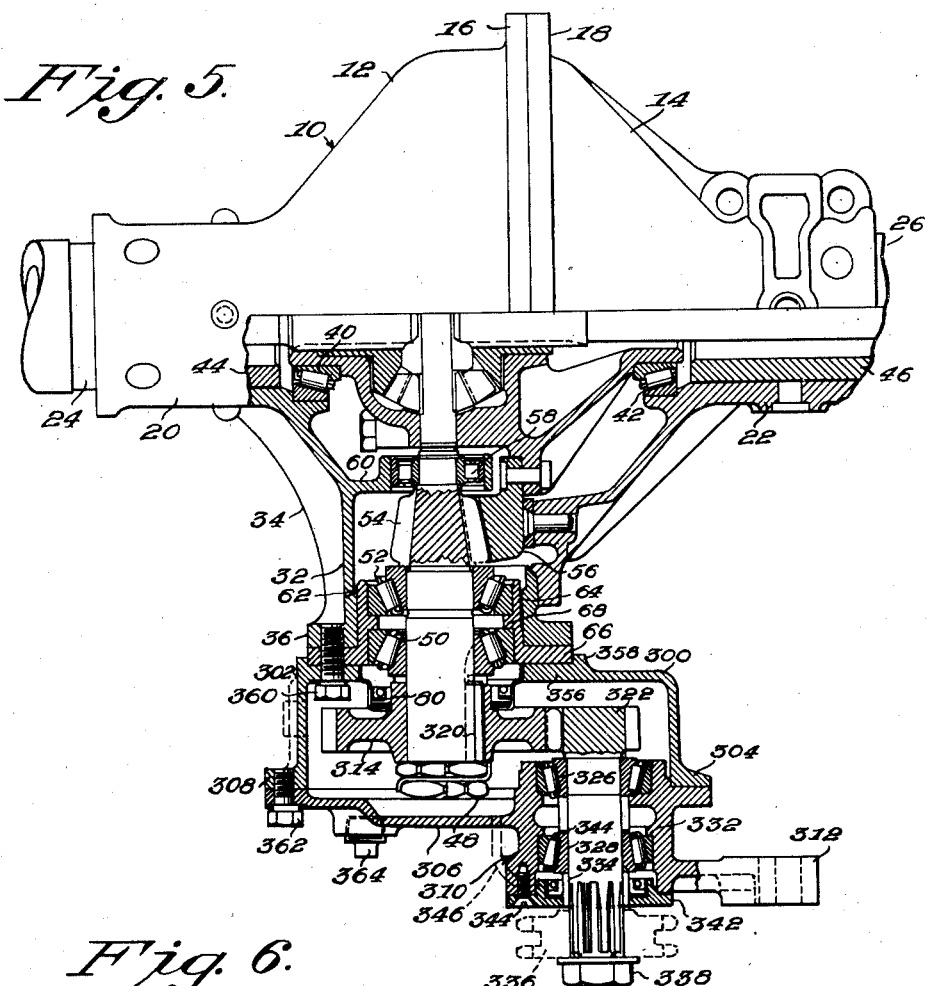

Patented June 25, 1946

2,402,637

UNITED STATES PATENT OFFICE 2,402,637

DRIVE MECHANISM

Beverly W. Keese, Oshkosh, Wis., assignor to The Timken-Detroit Axle Company, Detroit, Mich., a corporation of Ohio Application June 30, 1944, Serial No. 542,917

6 Claims. (Cl. 74—326)

This invention relates to improvements in drive mechanisms and has particular reference to a drive mechanism for apparatus operating at low speed, such as certain types of agricultural machinery.

Recent developments in various types of special purpose machinery and particularly in agricultural machinery such as harvesters and combines have indicated the desirability of providing such machines with power plants for operating the functional mechanism and propelling the machines over the crop area.

Such machines differ in form and arrangement of the mechanical units but have various factors in common such as moderate axle loads and slow speed.

It has been found that a comparatively light automotive vehicle drive axle such as is used for the smaller standard automobiles or light trucks is entirely satisfactory for carrying such self-propelled agricultural machines and can be readily and economically adapted to the various forms of such machines.

Such axles, however, do not have sufficient gear reduction ratios to provide efficient operation at the slow speeds at which such machines must be propelled.

It is a primary object of the present invention to provide a novel combination of a suitable standard or production automotive drive axle and special auxiliary reduction gear units especially designed for the construction and arrangement of the particular type of machine to which it is to be applied and for the desired operating speed. In these improved combinations, the same construction of drive axle may be used for various forms and sizes of machines of the same general character and specially designed auxiliary reduction gear units may be combined with such standard or production axles to provide the special operating characteristics, gear ratios, reverse drives, etc., desired in particular installations.

It is a further object of the invention to provide a farm combine or like drive wherein additional reduction gear mechanism is combined with a standard or production drive axle by means embodying a minimum of special parts and at the same time with parts so accurately piloted and securely assembled that proper alignment of the working parts and meshing of the gears is maintained under maximum loads.

A further object resides in the provision of an improved adapting means whereby a reduction gear mechanism is secured directly to and operatively associated with a standard production type of drive axle.

A still further object resides in the provision of a drive mechanism wherein a speed reducing and change speed gear unit is directly secured to and operatively associated with a standard production type of drive axle housing.

An additional object resides in the provision of an improved low speed drive axle wherein an auxiliary reduction gear unit is secured to the bearing cage bolting flange of a standard production type of drive axle without necessitating changes in the parts of the production axle.

Other objects and advantages will be apparent from the following description when considered with the appended claims and the accompanying drawings wherein suitable mechanical embodiment for the purpose of disclosing the invention and two somewhat modified forms thereof are illustrated.

In the drawings:

Figure 3 is a fragmentary sectional view taken on the line 3—3 of Figure 2;

Figure 4 is a top plan view of a modified axle construction, a portion being broken away and shown in section to better illustrate the construction thereof;

Figure 5 is a top plan view of a still further modified form of drive axle constructed according to the invention, a portion being broken away and shown in section to better illustrate the construction thereof; and Figure 6 is a front elevational view of the drive axle shown in Figure 5.

Figure 1:
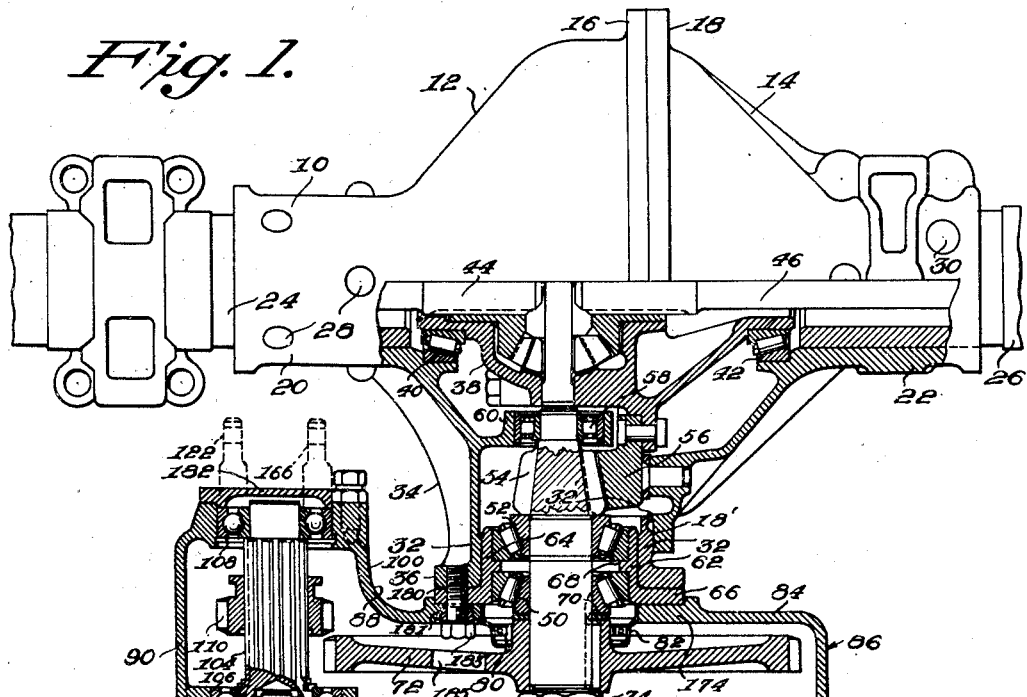
Figure 1 is a top plan view of a fragmentary portion of a drive axle constructed according to the invention, certain parts being broken away and shown in section to better illustrate the construction thereof.
Figure 2:
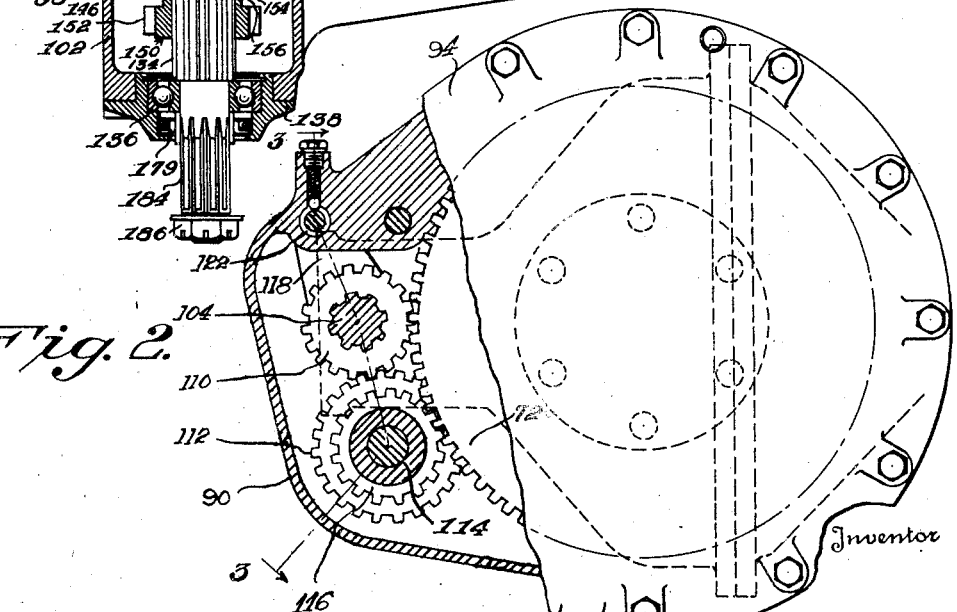
Figure 2 is a front elevational view of the drive axle shown in Figure 1, a portion of the front cover being broken away to show the internal arrangement.

With continued reference to the drawings and particularly to Figures 1, 2 and 3 thereof, the numeral 10 generally indicates an axle housing of the split type having a cast center portion formed in two parts, as indicated at 12 and 14, provided at their large ends with mating bolting flanges 16 and 18, respectively, through which suitable connecting means such as screws or bolts (not illustrated) extend to secure the two parts of the center portion rigidly together. Opposite the respective bolting flanges 16 and 18 the center parts are each provided with a reduced cylindrical end portion, 20 and 22, respectively, into which the inner ends of respective housing tubes 24 and 26 are inserted and rigidly secured by suitable means, such as the rivets 28 and 30.

The center part 12 is provided with a pilot sleeve extension 32 preferably reinforced by ribs, as indicated at 34, and terminating in an annular external flange 36 provided with a machined end surface lying in a plane perpendicular to the axis of the sleeve 32.

The flange 18 on the other housing section 14 is formed with an annular rib 18' to fit within the mating flange 16 on housing section 12 and against this rib a stop shoulder 32' on the inner end of sleeve 32 at one side thereof is adapted to abut. This construction facilitates the rapid assembly of the two housing sections with the bolt receiving openings in the mating flanges 16 and 18 in accurate registration. This housing construction is generally similar to that shown in the patent of Herbert W. Alden, 2,056,881, dated October 6, 1936.

Within the center portion of the axle housing a differential mechanism, generally indicated at 38, of some known or desired construction, is journalled in end bearings 40 and 42 mounted in bearing seats formed internally of the housing parts 12 and 14, respectively, and from this differential mechanism axle shafts 44 and 46 extend outwardly through the respective housing tubes 24 and 26 and are connected with road wheels or their equivalent in a manner well known to the art.

A propeller shaft section 48 is journalled in the extension 32 by suitable means, such as the opposed roller bearings 50 and 52, and carries at its inner end a bevel pinion gear 54 which meshes with a bevel ring gear 56 carried on the cage of the differential mechanism 38. At its inner end beyond the pinion gear 54 the shaft 48 is preferably piloted in an anti-friction bearing 58 mounted in a bearing seat 60 formed integrally with the housing member 12 at the inner end of the cylindrical extension 32.

The bearings 50 and 52 are preferably supported in a common bearing cage, generally indicated at 62, having a cylindrical portion 64 which is telescopically received in the outer end of the extension 32 and is provided with an upwardly extending end flange 66 which overlies the flange or boss 36 and has its side surfaces machined to lie in parallel planes which are also perpendicular to the axis of the extension 32 and shaft 48, said flange having its peripheral surface carefully machined to be concentric with the axis of shaft 48.

The cage 64 is provided with an internal rib 68 intermediate its length which separates the outer races of the two anti-friction bearings 50 and 52. The inner race of bearing 52 abuts the large end of gear 54 while the inner race of bearing 50 abuts the spacing washer 70 disposed between the inner race of the bearing and the cylindrical hub portion of a gear, generally indicated at 72, keyed on the outer end of the shaft 48 and secured in operative position by suitable means, such as the shaft end nuts 74 and 76 and cooperating lock washer 78. With this arrangement adjustment of the bearings 50 and 52 may be obtained by tightening the nuts 74 and 76 on the outer end of shaft 48.

An oil seal 80 of conventional or desired construction surrounds the inner end of the hub portion of gear 72 and is enclosed in a cap or shield 82 which is forced into and fits tightly in an aperture provided in the portion 84 of a gear housing or casing, generally indicated at 86.

With this arrangement, when the gear 72 is driven the shaft 48 will be rotated and the gear 54 will drive the gear 56 which in turn will drive the axle shafts 44 and 46 through the differential mechanism 38.

The gear housing portion 84 is generally bowl shaped having an end wall 88 and a side wall 90 which terminates in a bolting flange 92. A gear housing cover member 94 overlies the open end of the member 84 and is provided with a bolting flange 96 secured to the bolting flange 92 by suitable means, such as the bolts or screws 98.

The gear housing portions 84 and 94 are provided with co-axial substantially cylindrical projections 100 and 102 which together constitute a substantially cylindrical receptacle at one side of the gear 72.

A splined shaft 104 is journalled in the cylindrical extension 100 by the end bearings 106 and 108 held in seats provided in the expanded portion of the housing member 84 and carries an axially slidable gear 110 which in one of its operative positions meshes directly with the gear 72 and in another of its operative positions meshes with a reversing gear 112 carried on a countershaft 114 which is parallel to the shaft 104, the reversing gear 112 having a portion 116 which is constantly in mesh with the gear 72.

Thus by movement of the gear 110 along the shaft 104 the gear 72 may be operatively connected with the shaft for drive in either direction.

The gear 110 is moved from one to the other of its two operative positions by a yoke member 118, particularly illustrated in Figure 3, which engages in an annular groove 120 in the gear 110 and is secured to a shift rod 122 which is supported in the gear housing for sliding movement between operative positions determined by the annular reduced portions 124, 126 and 128 and the spring-pressed ball detent 130. The intermediate reduced portion 126 serves to retain the gear 110 in an inoperative or neutral position in which the gear 72 is disconnected from the shaft 104.

As the gear 72 is much larger than the gear 110, a ratio of seventeen to seventy-seven having been selected for one particular installation, it is obvious that a large ratio of gear reduction is obtained by this auxiliary reduction gear in addition to that obtained by the gear train comprising the bevel gears 54 and 56.

A second splined shaft 134, coaxial with the shaft 104, is journalled near one end in an anti-friction bearing 136 seated in a cap member 138 secured to the outer end of the extension 102 of the gear housing cover 94, and is journalled at its opposite end in an anti-friction bearing 140 which receives a reduced end portion 142 of the shaft 134, said bearing being received in a well or bore provided in the enlarged end portion of the shaft 104. This enlarged end portion of shaft 104 is provided with a gear 144 having external peripheral gear teeth 146 and internal clutch teeth 148. A gear element generally indicated at 150 is slidably mounted on shaft 134 and is provided with a set of gear teeth at 152, and a set of clutch teeth 154 separated from the gear teeth by an annular groove 156.

The gear 150 is slidable along the shaft 134 and in one of its operative positions the clutch teeth 154 engage the clutch teeth 148 to lock the shafts 134 and 104 together rotationally, while in the other operative position the gear teeth 152 mesh with the teeth 158 of a gear element, generally indicated at 160 and particularly shown in Figure 3. The gear element 160 is mounted for free rotation on the shaft 114 and has a set of gear teeth 162 constantly in mesh with the teeth of the gear element 144 formed on the end of shaft 104.

The gear element 150 is moved along the shaft 134 by a yoke member 164 which engages in the annular groove 156 and is secured to a shift bar 166 slidably mounted in the gear casing. The shift bar 166 has two operative positions, as indicated by the annular recessed portions 168 and 170 which are engaged by the spring pressed ball detent 172, as shown in Figure 2. In one operative position the clutch teeth 154 engage with the clutch teeth 148 to lock the shafts 134 and 104 together for unitary rotation, as explained above. In the other operative position the gear teeth 152 mesh with the gear teeth 158 to drive the gear element 160 which in turn drives the shaft 104 through the gear teeth 162 and 146. As the gear teeth 158 are greater in number than the gear teeth 152 and the gear teeth 146 are greater in number than the gear teeth 162, the shaft 104 will be driven at a reduced speed relative to the speed of the shaft 134.

The shift bars 122 and 166 are operably mounted and arranged to provide either a forward or reverse drive for the axle and to selectively provide either one of two different gear ratios for each direction of axle drive, in a combined variable speed and reduction gear assembly, with a single means for directly mounting and supporting the same upon the drive axle housing.

The casing part 84 is provided, surrounding the aperture receiving the oil seal cap 82, with a bolting flange 174 at the outer edge of which there is an external boss 178. The outer surface of the bolting flange and the inner surface of the boss are both accurately machined so that bolting flange 174 fits flat against the outer surface of the flange 66 of the bearing cage 62 and the boss 178 fits tightly about the periphery of the bearing cage flange. Since the bearing cage fits tightly in the aperture in the extension 32 of the axle part 12 and the boss 178 fits tightly about the periphery of the bearing cage flange, the casing part 84 is definitely and rigidly located relative to the axle part 12 and is able to carry the auxiliary reduction gear and variable speed mechanism without support other than from the axle. The gear housing is secured to the axle housing by suitable means such as screws or bolts, one of which is indicated at 180, which pass through the bolting flange 174 and the bearing cage flange 66 into the flange 36 of the axle housing extension 32. The piloting flange or boss 178 serves to relieve these attaching bolts of severe vertical shearing stress. Split taper dowels, as indicated at 181, surround the attaching studs 180 and register in taper holes in case part 84 binding the stud and the case against rotating stress. In order to properly seat the taper dowels in the casing apertures, each stud 180 is provided with a nut 183, and gear 72 may be provided with an opening 185 through which these nuts may be engaged by a suitable wrench.

An oil seal 179 surrounds the shaft 134 in the outer end of cap 138 while the casing at the outer end of shaft 104 is closed by a bolted cap 182. Cap 182 and seal 179 serve to retain lubricant in the gear casing 86 while the seal 80 prevents this lubricant from flowing into the axle housing 10. Thus the gear housing and the axle housing each has its own separate lubricant supply and two different kinds of lubricant may be used in the two housings if desired.

Outside the cap 182 the shaft 134 is provided with a splined end portion 184 to which a suitable coupling member such as a universal joint flange, a gear or a chain sprocket may be mounted and secured in place by the end nut 186.

From the above description it will be particularly noted that the complementary axle and differential housing sections are rigidly united along a vertical plane at right angles to the axle and parallel to the axis of the propeller shaft 48. By offsetting the propeller shaft axis to one side of said plane, fabrication of the housing sections is simplified and the accurate mounting of the differential drive mechanism and the reduction gear assembly thereon is greatly facilitated, while the load is advantageously distributed upon the two axle housing sections.

It will also be appreciated that since the diameter of the housing structure 84 exceeds that of the sleeve 32 and is at least substantially equal to the major diameter of the axle housing 10, the means above described for piloting the housing 84 to its applied position with relation to said sleeve materially aids in the accurate and rapid assembly and mounting of the reduction gear housing in rigidly attached relation to the axle housing 10.

In this arrangement the axle housing 10 and the parts operatively mounted therein comprise a standard production drive axle for an automotive vehicle such as an automobile or truck, while the gear casing or housing 84 is a specially manufactured unit and is secured to the axle housing without necessitating any changes in the axle housing or in the parts associated therewith. The arrangement therefore provides an inexpensive construction which may be economically produced in small quantities and readily assembled to provide a drive axle of the type desired for the special purpose indicated.

Referring now to Figure 4, there is illustrated a somewhat modified form of drive axle in which the conventional automobile axle is the same as that described above in connection with Figures 1, 2 and 3 but in which a smaller and simplified auxiliary reduction gear unit has been combined with the standard drive axle.

In this arrangement the reduction gear housing, generally indicated at 200, comprises a substantially flat circular base plate 202 having a peripheral bolting flange 204, and a housing member 206 having a substantially annular bolting flange 208 and at one end thereof an apertured boss 210 constituting a bolting flange for a bearing cage member generally indicated at 212. In this construction the outer wall of the gear housing part 206 slopes from the boss 210 to the opposite side of the housing, as is clearly indicated in Figure 3.

The outer end of the propeller shaft section of the axle receives, in this construction, a bevel gear 214 which meshes with a bevel gear 216 formed on the end of the drive shaft 218 journalled in the cage 212 by suitable anti-friction bearings, such as the roller bearings 220 and 222.

The axis of the shaft 218 is perpendicular to the axis of the shaft 48 in the arrangement shown but may be at right angles to the axis of the shaft 48 and spaced either above or below this axis if the gears 214 and 216 are made of hypoid form.

The end of shaft 218 projecting from bearing cage 212 is splined and receives a drive gear 224 secured thereon by a suitable end nut 226. The gear 224 may be either a spur gear or a chain sprocket as the practical coniderations of the connection of the engine to the drive axle may dictate.

The cage 212 is provided with internal ribs or shoulders which position the outer races of the bearings 220 and 222, while the inner race of bearing 220 bears against a controlled thickness spacing washer 223 interposed between the bearing inner race and a radial shoulder on shaft 218 and the inner race of bearing 222 bears against the end of a cylindrical hub portion of gear 224 so that the bearings 220 and 222 may be properly adjusted by inserting a spacing washer of proper thickness and tightening nut 226 on shaft 218. An oil seal 228 surrounds the hub portion of gear 224 within the outer end of cage 212 to prevent loss of lubricant around the shaft 218.

Cage 212 is secured to bolting flange of boss 210 by suitable screws or bolts, as indicated at 230, and suitable spacers or shims 232 may be disposed between the mating surfaces of the boss 210 and the bolting flange 234 on the cage to provide proper cone centering adjustment of the gears 214 and 216. The gear housing completely surrounds the auxiliary reduction gear train and provides a lubricant reservoir which is separated from the lubricant reservoir of the axle housing 10 by the seal 80 hereinabove referred to, and lubricant may be introduced into the reduction gear housing 200 through a suitable aperture normally closed by a screw plug, as indicated at 234.

The base plate 202 actually comprises two concentric bolting flanges 204 and 236 offset in the direction of the thickness of the plate to provide two concentric annular or radial shoulders 238 and 240, both of which are accurately machined to proper diametrical dimensions and accurate concentricity with each other. The shoulder 238 surrounds the periphery of the flange 66 of bearing cage 64 and accurately centers the auxiliary reduction gear housing relative to the extension 32 of the axle housing while the bolting flange 208 of gear housing part 206 is piloted on shoulder 240 to accurately locate the part 206 relative to the base plate 202. The parts 202 and 206 are secured together by suitable means such as angularly spaced bolts or screws, one of which is indicated at 242. The base plate 236 is secured to the axle housing by suitable angularly spaced bolts or screws, one of which is indicated at 244, passing through the bolting flange 236 and the bearing cage flange 66 and threaded into the bolting flange or boss 36 at the outer end of the axle housing extension 32.

The auxiliary reduction gear mechanism of Figure 4 provides only a single reduction gear ratio, the ratio of the construction illustrated being approximately eleven to twenty-three or one to two. In this arrangement it is contemplated that other means are provided for selectively changing the speed and providing a reverse drive if desired. The small casing of this form, however, is exceptionally strong and compact and is extremely economical to manufacture and simple to install on the conventional axle structure.

A still further modified form of the invention is shown in Figures 5 and 6, wherein the same type of standard or production axle is used as indicated above in connection with Figures 1 and 4, but a different form of auxiliary reduction gear mechanism is provided.

In this modified arrangement the auxiliary reduction gear housing, generally indicated at 300, comprises a bowl shaped, generally circular member 302 having an end wall facing the end of the axle housing and an annular side wall provided at the open side of the housing with a bolting flanged 304. This member is generally circular in outline but is provided at one side thereof with a partly circular radial extension, as is clearly shown in Figure 6.

The cover member 306 is generally in the form of a flat plate having a peripheral bolting flange 308 but a portion of this member is formed to provide an integral bearing cage generally indicated at 310 and an idler pulley support 312.

A gear 314 is press fitted onto the outer end of shaft 48 and is held in position on the shaft by the end nuts 316 and 318 and against rotation relative to the shaft by a suitable key 320. This gear meshes with a spur gear 322 preferably formed on the inner end of a drive shaft 324 journalled in the integral bearing cage 310 by the spaced anti-friction roller bearings 326 and 328.

Bearing cage 310 is generally cylindrical in form and is provided internally with a pair of radial ribs 330 and 332 which are disposed between the bearings 326 and 328 and locates the outer races of these bearings. The inner race of bearing 326 bears against a shaft shoulder at the back side of gear 322 and the inner race of bearing 328 contacts the inner end of a cylindrical spacer 334 which surrounds the shaft 324 between the inner race of bearing 328 and the adjacent side of a gear or chain sprocket 336 held on the splined outer end portion of shaft 324 by end nut 338 and spacer washer 340. A cylindrical spacer 342 is disposed between the inner races of the roller bearings and has at one end thereof a plurality of shim washers 344 by means of which adjustment of the roller bearings may be controlled when the nut 338 is tightened to force sprocket 336 toward gear 322.

During operation gear 314 lifts lubricant from the lower portion of the casing to the point at which it meshes with gear 322 at which point the lubricant is forced out laterally from between the gear teeth. As the location of the meshing of the teeth is in line with the space between the inner and outer races of bearing 326, this lubricant is forced into and through bearing 326 and into the space between the internal ribs 330 and 332, and some of it flows through bearing 328. An oil seal 340 surrounding the spacer 334 within a cap 342 secured to the outer end of the integral cage 310 by suitable means, such as the screws 344, prevents the lubricant from flowing outwardly along the shaft 324. A channel 346 is provided leading from the space between the oil seal 340 and the adjacent end of bearing 328 back to the interior of the housing so that a continual flow of lubricant through bearings 326 and 328 is provided.

The upstanding lug or bracket 312 on the cover member 306 is provided with a boss 348 having a circular aperture and with an elongated boss 350 having an elongated aperture therein. A chain tightening idler sprocket 352 is mounted by a suitable support on boss 348 and boss 350 is provided at the outer side thereof with a screw-threaded aperture 354 for receiving a take-up screw, not illustrated, for adjusting the position of the idler pulley.

The housing member 302 is provided with a bolting flange 356 overlying the flange 66 of bearing cage 62 and surrounded by a circular boss 358 which engages the periphery of cage flange 66, in the manner indicated above, to positively pilot or locate the gear housing relative to the axle housing, and the gear housing is rigidly secured to the axle housing by suitable bolts or screws, one of which is indicated at 360 passing through the bolting flange 356 and the cage flange 66 and into the flange or boss 36 provided on the outer end of the axle housing extension 32 to rigidly connect the gear housing for the auxiliary reduction gear mechanism to the axle housing.

The cover plate 306 is rigidly secured to the housing member 302 by suitable screws or bolts, one of which is indicated at 362, passing through the bolting flange 308 and threaded into the bolting flange 304 of the member 302. Suitable apertures normally closed by screw plugs, as indicated at 364 and 366, are provided for draining lubricant from the housing 300 and supplying lubricant thereto.

This construction also provides a single gear reduction between the drive shaft 324 and the propeller shaft section 48, the gear ratio in the form illustrated being approximately 12 to 35 or 1 to 3. This construction also obviously provides a simple and inexpensive conversion for the standard vehicle axle to produce the slow speed drive desired for the type of installation indicated.

It is to be noted that while three somewhat different forms of auxiliary reduction gear units are shown they are all secured to the standard axle housing in the same manner and in a manner which provides a secure and rigid attachment without the necessity of modifying any parts of the standard axle construction and which does not require any additional support for the auxiliary gear unit.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination with an axle housing having a sleeve projecting therefrom at an angle to the housing axis, a propeller shaft bearing cage internally contacting the wall of said sleeve at its outer end and having a flange of substantially the same external diameter as the sleeve end and in abutting contact with the end face thereof, a housing for propeller shaft drive mechanism having a side wall provided with a seating face and an annular piloting surface circumscribing said face for cooperative contact with the peripheral surface of said cage flange to direct said seating face, in substantial parallelism with the cage flange, into seating contact with the outer side face thereof, and means common to said housing and bearing cage to rigidly secure the same in their relative assembled positions on said axle housing sleeve.

2. In combination with an axle housing having two sections rigidly joined on a plane perpendicular to the axis of the housing and a propeller shaft supporting sleeve extending at an angle to said axis; a propeller shaft journalled in said sleeve; variable speed mechanism and speed reduction gearing connected in power transmitting relation to said propeller shaft, said variable speed mechanism including a power input shaft and change speed gearing wholly disposed in laterally offset relation to the axis of the propeller shaft, a common housing structure for the outer end of the propeller shaft, the variable speed mechanism and the speed reduction gearing, and a single attaching and supporting means for said housing structure rigidly connected with said axle housing sleeve.

3. In combination with an axle housing having a propeller shaft supporting sleeve projecting therefrom at angle to the housing axis, a propeller shaft journalled in said sleeve and having a speed reducing gear fixed to its outer end, housing structure including a body section fixed to said sleeve and containing said reducing gear and a cover section detachably secured to an open side of said body section, said housing sections in radially spaced relation from the propeller shaft having opposed oppositely projecting extensions parallel with the propeller shaft axis, and variable speed mechanism mounted in said housing extensions in power transmitting relation to said reducing gear.

4. The combination defined in claim 3, in which said variable speed mechanism includes a power input shaft journalled in the extension of the housing cover section and a power output shaft journalled in the extension of the housing body section.

5. The combination defined in claim 3 in which said variable speed mechanism includes a power input shaft and a power output shaft journalled in the extensions of the housing sections in aligned relation with each other, and wherein a gear on said output shaft has direct meshing engagement with said speed reducing gear.

6. The combination defined in claim 3, in which said variable speed mechanism includes a power output shaft journalled in the extension of the housing body section and a manually shiftable gear thereon directly engageable with said speed reducing gear.

BEVERLY W. KEESE.

Certificate of Correction

Patent No. 2,402,637.

June 25, 1946.

BEVERLY W. KEESE

It is hereby certified that errors appear in the printed specification of the above numbered patent requiring correction as follows: Column 3, line 49, for "upwardly" read *outwardly*; line 62, for "the spacing" read *a spacing*; column 7, line 7, for "coniderations" read *considerations*; and that the said Letters Patent should be read with these corrections therein that the same may conform to the record of the case in the Patent Office.

Signed and sealed this 5th day of November, A. D. 1946.

[SEAL]

LESLIE FRAZER,
*First Assistant Commissioner of Patents.*